Patented Aug. 24, 1943

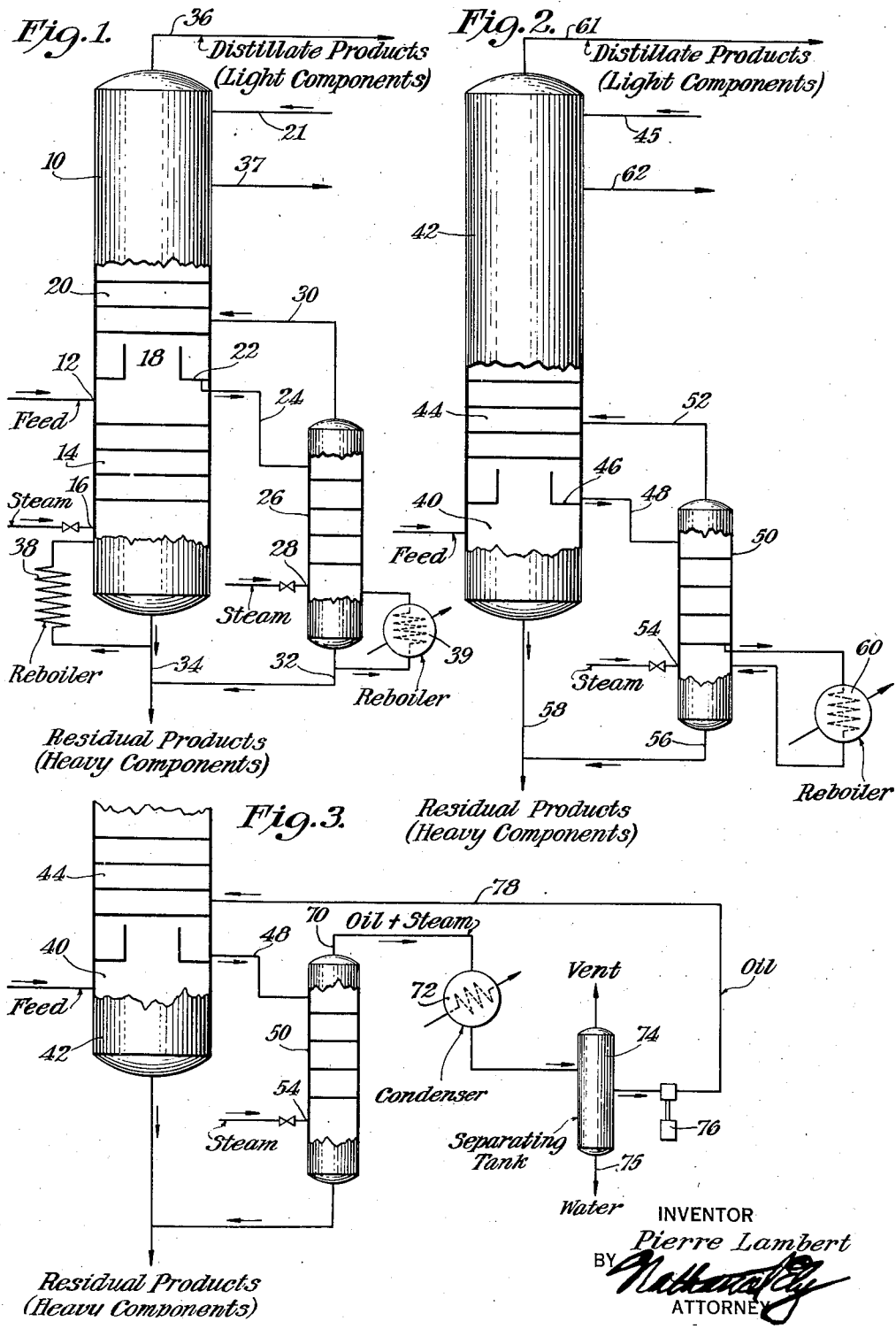

2,327,534

UNITED STATES PATENT OFFICE 2,327,534

DISTILLATION

Pierre Lambert, New Rochelle, N. Y., assignor to The Lummus Company, New York, N. Y., a corporation of Delaware Application July 14, 1939, Serial No. 284,430

4 Claims. (Cl. 196—94)

This invention relates to improvements in the method of fractionally distilling complex liquid mixtures.

In the distillation of complex hydrocarbon mixtures, such as petroleums, topped crudes, and the like, separation of the light from the heavier components is ordinarily accomplished in a distillation column equipped with means for reboiling or stripping the bottoms therefrom with steam. However, it is not always possible to attain the desired separation in such a system, especially if the heavier components are greater in amount than the light components, because of the difficulty encountered in economically stripping all of the light components from the heavier components in the stripping section of the distillation column.

As an example of such difficulty, it is well known that the vapors rising from the stripping section past the feed plate or feed chamber in a distillation column carry a portion of the heavier components of the feed into the rectifying section, which heavy components are returned to the stripping section by means of the reflux from the plates above the feed. Since any light components which may be present in the reflux must be stripped out after the reflux has mixed with the feed plate liquid, the total stripping duty in the stripping section is thereby increased. Moreover, when the nature of the feed is such that the liquid portion is considerably heavier than the reflux coming from the plates above, the feed has an absorbing effect on the light components in the reflux and subsequent stripping will be more difficult.

Further, when the heavy components are large in amount as compared to the light components, a greater amount of stripping steam must be used in the stripping section, or more heat must be supplied if the heavy components are subjected to reboiling, to insure complete separation of the light from the heavy components. Use of excessive quantities of stripping steam is objectionable for reasons of economy, whereas use of additional heat to raise the temperature of reboiling is not only expensive, but may be entirely impracticable because of the tendency of the heavy components to undergo cracking reactions when heated to temperatures much above 700° F.

The principal object of the present invention is to provide a method of distilling hydrocarbon mixtures by means of which it is possible to sharply separate the light from the heavy components therein, with a material reduction in the amount of utilities needed to effect the separation.

A further object of the invention is to provide a method of distilling a hydrocarbon mixture containing a small amount of light components and a large amount of heavy components, by means of which the stripping duty required to sharply separate the light from the heavy components is materially reduced.

Another object of the invention is to provide a method of sharply separating the light from the heavy components in a hydrocarbon mixture, the heavy components of which may not be subjected to required reboiling temperatures without danger of decomposition.

Still another object of the invention is to provide a distillation method in which any corrosive materials occurring in the lower boiling range of the heavy components of a hydrocarbon mixture may be segregated therefrom, whereby their corrosive effect in reboiling of the heavy components is eliminated.

Further objects and advantages of the invention will be apparent from the following description of a preferred form of embodiment of the invention taken in connection with the attached drawing, illustrative thereof, in which:

Fig. 1 is a diagrammatic view of a preferred flow arrangement for carrying out the present invention;

Fig. 2 is a diagrammatic view of a modified flow arrangement;

Fig. 3 is an alternative flow arrangement of that shown in Fig. 2.

The present invention contemplates the sharp separation of the light components from a hydrocarbon mixture by the withdrawal of the entire reflux from a distillation column at the bottom of the rectifying section. The withdrawn reflux is stripped in an independent stripping zone to separate the light components from the heavy components therein, the light components being returned to the distillation column above the point of reflux withdrawal, and the heavy components being combined with the bottoms from the distillation column to form a residuum free of light components. By preventing the reflux from mingling with the heavy components in the stripping section of the distillation column, and by stripping the reflux in a separate zone, a sharper separation of the light from the heavy components is effected, with an overall reduction in the amount of utilities necessary. In addition, the efficiency of fractionation is increased.

The process described above may also be applied to the flash distillation of a petroleum mixture, in which the hydrocarbons are overflashed and the flashed vapors are passed to a rectifying zone. The entire reflux is withdrawn from the bottom of the rectifying zone and is stripped independently of the flashing operation. Employment of a flash distillation is particularly useful when the heavy components are of such a character that they can not be subjected to high temperatures of reboiling without danger of cracking.

I have also found the present invention to be especially useful when corrosive materials occurring in the lower boiling range of the heavy components are present in the material to be separated. By stripping the reflux independently, whereby the corrosive materials are concentrated in the bottoms from the reflux stripper, I am able to avoid the corrosion difficulties which would otherwise be encountered in reboiling of the heavy components.

In accordance with a preferred form of embodiment of my invention, as shown in Fig. 1, a hydrocarbon mixture, such as a crude petroleum or a topped crude, suitably preheated, is fed to fractionating tower 10 at 12. Although many types of hydrocarbon mixtures may be fractionated by means of my invention, it is especially adaptable to mixtures containing a large amount of heavy components and a small amount of light components. Tower 10 is a typical distillation column, containing bubble plates, suitable for fractionation of liquid mixtures.

The liquid portion of the feed, consisting primarily of the heavy components of the hydrocarbon mixture, flows downward through the stripping section 14 where any light components therein are stripped out. For this purpose, a reboiler 38 is ordinarily provided. If the bottoms is of such a nature, however, that it is subject to decomposition at the reboiling temperature required, stripping steam may be introduced at 16.

The vapors from 14 and the feed vapors, rising through vapor passage 18 into the rectifying section 20, entrain a portion of the heavy components of the feed. These heavy components are absorbed by reflux liquid, which is conveniently introduced at 21. In the lower portion of the rectifying section 20, this reflux contains a considerable proportion of light components, which would normally be carried into the stripping section 14 if the reflux were allowed to mix with the incoming feed.

In accordance with my invention, this reflux is collected on plate 22, which contains vapor passage 18 but which has no liquid downflow pipes. The total reflux is then drawn off through line 24 and fed to stripping column 26, in which the light components are stripped out, as by use of reboiler 39 or stripping steam introduced at 28. These light components are returned to tower 10 at a suitable point above the reflux withdrawal by line 30. The bottoms from the stripping column 26, consisting mostly of the lighter portion of the heavy components, is removed at 32. Since the bottoms from stripper 26 are adjacent in character to the bottoms removed at 34 from tower 10, the two bottoms streams may be combined to form a residual product free of light components. The light components are removed as an overhead distillate at 36, and, if desired, a side stream may be removed at 37.

It will be appreciated that, by preventing the reflux from the rectifying section from mixing with the feed, I am able to effect a material reduction in the overall amount of utilities required for the separation. Considerably less stripping steam or heat for reboiling is necessary in tower 10, as the quantity of light components in the stripping section is substantially lowered. Since the reflux stream withdrawn in line 24 is only a small percentage of the feed to tower 10 and contains no very high boiling components, the amount of stripping steam or reboiling heat required in stripper 26 is small.

Furthermore, because of the smaller percentage of light components in the stripping section, I am able to accomplish the separation of a tower containing fewer decks, whereby the overall apparatus cost is as low as, or lower than, that for a single column with added decks.

It is, of course, to be understood that the separate stripping column 26 may be incorporated inside tower 10 as a stripping zone separate from stripping section 14, if it is found desirable to do so.

As a modification of my process, the components of the hydrocarbon mixture may be separated by means of flashing. In such case, the forms of apparatus in Figs. 2 and 3 may be employed. These forms of apparatus are especially applicable when reboiling of the bottoms from tower 10 (Fig. 1) is not practicable. Fig. 3 is further applicable when, for any reason, the presence of steam in the distillation tower is found objectionable.

When a hydrocarbon mixture is to be subjected to the flashing operation, I prefer to heat the mixture to a temperature at which it will be somewhat overflashed. In this manner I insure substantial vaporization of all the light components in the mixture. However, a considerable portion of the heavy components will also be vaporized with, or entrained by, the light component vapors.

It may be said that, in general, the greater the overflash, the better the separation obtained between light and heavy components. However, the maximum improvement obtainable is limited by the mixing of the downcoming overflashed material with the bottoms. This material, as previously mentioned, often contains a considerable amount of light components, which must be restripped from the heavy material if allowed to mix therewith. This condition is not improved by the overflashing.

In accordance with the form of embodiment of my invention shown in Fig. 2, a suitably preheated hydrocarbon mixture is fed to flashing chamber 40 in distillation tower 42. The mixture is preferably overflashed so that subtsantially all the light components are vaporized. Because of the overflashing, a considerable amount of the heavy components is entrained in the vapors and is carried into the rectifying section 44. Reflux introduced at 45 absorbs these heavy components from the vapor stream. The descending reflux containing the absorbed heavy components is collected on plate 46 and passed through line 48 to stripping column 50. The light components which are stripped from the reflux are returned to tower 42 by line 52. For stripping purposes in column 50, either stripping steam, introduced at 54, or bottoms reboiler 60 may be used.

As in the operation of the apparatus shown in Fig. 1, bottoms 56 from tower 50, being adjacent in character to bottoms 58 from tower 42, may be combined therewith to form a residual product free of light components. The light components are removed at 61 as overhead distillate, and, if desired, a side stream may be withdrawn at 62.

If it is desired to use steam to strip the hydrocarbon mixture, but, because of corrosive effects or any other reason, the presence of steam in flash distillation tower 42 or in fractionating column 10 is objectionable, the form of embodiment shown in Fig. 3 may be used. Steam is employed as the stripping medium in column 50. The light components and steam are taken off overhead at 70, condensed in condenser 72, and allowed to separate in settling tank 74. Water is removed at 75 and the light components, free of water, are returned by pump 76 through line 78 to tower 42. In this manner steam is prevented from entering tower 42.

Use of the reflux stripper has a definite advantage, especially in the flashing operation, when the residual product has a boiling range such as to make it impracticable to reboil it at a reasonable temperature, as is required in the ordinary scheme of reboiling and stripping of bottoms. The carrying effect of the light components causes the feed temperature to be lower than the reboiling temperature would be, even when a considerable amount of overflashing is done. The overflashed material has a relatively low boiling range and may be easily reboiled in the side stripper. It is, therefore, possible to accomplish the separation at a considerably lower temperature.

As an example of the application of my invention, it was desired to fractionate a Reitbrook crude having a gravity of 21.2° A. P. I., to obtain a residue consisting of 65% of the original charge. Analysis of the crude indicated that the desired residue had an initial flash point, at atmospheric pressure, in excess of 800° F. As some cracking would occur at this temperature, reboiling of the bottoms could not be relied upon. The crude was heated to approximately 750° F., which temperature represented about a 38 to 40% flash of the crude, and was then introduced into flash chamber 40 of the apparatus shown in Fig. 2. The flashed vapors contained substantially all the light components in the crude and a portion of the heavier components as well. By collecting all of the reflux at the bottom of the rectifying section and separately stripping this reflux to remove the light components therefrom, it was possible to obtain the desired residue by combining the bottoms from the reflux stripper with the bottoms from the distillation tower.

While I have shown and described preferred forms of embodiment of my invention, I am aware that other modifications may be made thereto, and I, therefore, desire a broad interpretation of my invention within the scope and spirit of the disclosure herein and the claims appended hereinafter.

I claim:

1. In the method of sharply fractionating a hydrocarbon mixture in a fractionating column to obtain a bottoms fraction comprising a predetermined percentage of said mixture consisting of all the heavy residual components thereof, the steps which comprise heating the hydrocarbon mixture to a flash temperature corresponding to the distillation temperature of the predetermined separation, flashing the heated mixture in the fractionating column to separate the greater portion of the light distillate components from the heavy residual components, stripping any retained light distillate components from the unvaporized heavy residual components, a substantial portion of the heavy residual components being vaporized with and entrained by the resulting light distillate component vapors, subjecting the light distillate component vapors to the action of a reflux liquid for the condensation and absorption in the reflux liquid of the vaporized and entrained heavy residual components, withdrawing the entire reflux liquid containing said condensed and absorbed heavy residual components and some light distillate components from said column at a point immediately above the point of feed without permitting any of said reflux liquid to commingle with the heavy unvaporized residual components in said column, separately stripping said withdrawn reflux liquid in an independent stripping zone to separate the light distillate components from the heavy residual components therein, returning the stripped light distillate components to said column at a point above the point of reflux withdrawal, removing from the fractionating column above the point of return of the stripped light distillate components all the light distillate components including those light distillate components withdrawn with the entire reflux liquid to the stripping zone, said removed light distillate components being free of the heavy residual components, separately withdrawing the bottoms from the fractionating column and the bottoms from the stripping zone, and joining said bottoms streams having similar and overlapping characteristics and jointly constituting the bottoms fraction comprising the predetermined percentage of the mixture and consisting substantially only of the heavy residual components of said mixture and being free of the light distillate components thereof.

2. In the method of sharply fractionating a hydrocarbon mixture in a fractionating column to obtain a bottoms fraction comprising a predetermined percentage of said mixture, consisting of all the heavy residual components thereof, the steps which comprise heating the hydrocarbon mixture to a flash temperature higher than the corresponding distillation temperature of the predetermined separation, overflashing said heated mixture in the fractionating column to separate substantially all the light distillate components therefrom, a substantial portion of the heavy residual components being vaporized with and entrained by the resulting light distillate component vapors, subjecting the vapors to the action of a reflux liquid for the condensation and absorption in the reflux liquid of the vaporized and entrained heavy residual components, withdrawing the entire reflux liquid comprising said condensed and absorbed heavy residual components and some light distillate components from said column at a point immediately above the point of feed without permitting any of said reflux liquid to commingle with the heavy unvaporized residual components in said column, separately stripping said withdrawn reflux liquid in an independent stripping zone to separate the light distillate components from the heavy residual components therein, returning the stripped light distillate components to said column at a point above the point of reflux withdrawal, removing from the fractionating column above the point of return of the stripped light distillate components all the light distillate components including those light distillate components withdrawn with the entire reflux liquid to the stripping zone, said removed light distillate components being free of the heavy residual components, separately withdrawing the bottoms from the fractionating column and the bottoms from the stripping zone, and joining said bottoms streams having similar and overlapping characteristics and jointly constituting the bottoms fraction comprising the desired predetermined percentage of the mixture and consisting substantially only of the heavy residual components of said mixture and being free of the light distillate components thereof.

3. In the method of sharply fractionating a hydrocarbon mixture in a fractionating column to obtain a bottoms fraction comprising a predetermined percentage of said mixture consisting of all the heavy residual components thereof, said mixture also containing components corrosive in the presence of steam, the steps which comprise heating the hydrocarbon mixture to at least a flash temperature corresponding to the distillation temperature of the predetermined separation, flashing said heated mixture in the fractionating column in the absence of steam to separate substantially all the light distillate components therefrom, a substantial portion of the heavy residual components being vaporized with and entrained by the resulting light distillate component vapors, subjecting the vapors to the action of a reflux liquid for the condensation and absorption in the reflux liquid of the vaporized and entrained heavy residual components, withdrawing the entire reflux liquid comprising said condensed and adsorbed heavy residual components and some light distillate components from said column at a point immediately above the point of feed without permitting any of said reflux liquid to commingle with the heavy unvaporized residual components in said column, separately steam stripping said withdrawn reflux liquid in an independent stripping zone to separate the light distillate components from the heavy residual components therein, condensing the resultant light distillate component vapors and steam and separating the water from the condensed light distillate components whereby the effect of the corrosive components is localized, returning the stripped light distillate components to said column at a point above the point of reflux withdrawal, removing from the fractionating column above the point of return of the stripped light distillate components all the light distillate components including those light distillate components withdrawn with the entire reflux liquid to the stripping zone, said removed light distillate components being free of the heavy residual components, separately withdrawing the bottoms from the fractionating column and the bottoms from the stripping zone and joining said streams to constitute the bottoms fraction comprising the predetermined percentage of the original mixture and consisting substantially only of the heavy residual components of said mixture and being free of the light distillate components thereof.

4. In the method of sharply fractionating a hydrocarbon mixture in a fractionating column to obtain a bottoms fraction comprising a predetermined percentage of said mixture consisting of all the heavy residual components thereof, the steps which comprise heating the hydrocarbon mixture to at least a flash temperature corresponding to the distillation temperature of the predetermined separation, flashing the heated mixture in the fractionating column to separate substantially all the light distillate components therefrom, a substantial portion of the heavy residual components being vaporized with and entrained by the resulting light distillate component vapors, subjecting the light distillate component vapors to the action of a reflux liquid for the condensation and absorption in the reflux liquid of the vaporized and entrained heavy residual components, withdrawing the entire reflux liquid containing said condensed and absorbed heavy residual components and some light distillate components from said column at a point immediately above the point of feed without permitting any of said reflux liquid to commingle with the heavy unvaporized residual components in said column, separately stripping said withdrawn reflux liquid in an independent stripping zone to separate the light distillate components from the heavy residual components therein, returning the stripped light distillate components to said column at a point above the point of reflux withdrawal, removing from the fractionating column above the point of return of the stripped light distillate components all the light distillate components including those light distillate components withdrawn with the entire reflux liquid to the stripping zone, said removed light distillate components being free of the heavy residual components, separately withdrawing the bottoms from the fractionating column and the bottoms from the stripping zone, and joining said bottoms streams having similar and overlapping characteristics and jointly constituting the bottoms fraction comprising the predetermined percentage of the mixture and consisting substantially only of the heavy residual components of said mixture and being free of the light distillate components thereof.

PIERRE LAMBERT.